United States Patent
Li et al.

(10) Patent No.: US 11,396,272 B2
(45) Date of Patent: Jul. 26, 2022

(54) CHILD SAFETY SEAT ALARM SYSTEM

(71) Applicant: Bambino Prezioso Switzerland AG, Steinhausen (CH)

(72) Inventors: Ruyi Li, Guangdong (CN); Zu Jian Liu, Guangdong (CN)

(73) Assignee: Bambino Prezioso Switzerland AG, Steinhausen (CH)

(*) Notice: Subject to any disclaimer, the term of this patent is extended or adjusted under 35 U.S.C. 154(b) by 48 days.

(21) Appl. No.: 16/952,082

(22) Filed: Nov. 19, 2020

(65) Prior Publication Data
US 2021/0155200 A1    May 27, 2021

(30) Foreign Application Priority Data
Nov. 25, 2019    (CN) .......................... 201911166523.2

(51) Int. Cl.
*B60R 22/48*    (2006.01)
*B60N 2/90*    (2018.01)
(Continued)

(52) U.S. Cl.
CPC .............. *B60R 22/48* (2013.01); *B60N 2/002* (2013.01); *B60N 2/2812* (2013.01); *B60N 2/90* (2018.02);
(Continued)

(58) Field of Classification Search
CPC .......... B60R 22/48; B60N 2/90; B60N 2/002; B60N 2/2812
(Continued)

(56) References Cited

U.S. PATENT DOCUMENTS 10,500,981 B1* 12/2019 Mahmoud ............... G08B 21/22
2014/0253314 A1* 9/2014 Rambadt ................ G08B 21/24
340/457.1
(Continued)

FOREIGN PATENT DOCUMENTS

CN    102874140 A    1/2013
CN    205951893 U    2/2017
(Continued)

*Primary Examiner* — Kerri L McNally
(74) *Attorney, Agent, or Firm* — Winston Hsu

(57) ABSTRACT

A child safety seat alarm system includes a child safety seat, an alarming mechanism, a detection mechanism, a trigger mechanism and a driving portion. The detection mechanism is configured to detect whether both states of the alarming mechanism and the detection mechanism meet a predetermined criterion. The trigger mechanism is switchable between an open state and a closed state. The detection mechanism is in a non-working state when the trigger mechanism is in the open state. The detection mechanism is in a working state when the trigger mechanism is in the closed state. When the child is seated in the child safety seat, the driving portion is operated to switch the trigger mechanism from the open state to the closed state so as to switch the detection mechanism to the working state. When the detection mechanism detects the states of the alarming mechanism and the detection mechanism meet the predetermined criterion, the alarming mechanism outputs an alarm signal for alarming. The child safety seat alarm system can remind a user whether or not a child is left in a car, this would prevent a dangerous scenario that the child is left in the car.

17 Claims, 9 Drawing Sheets

(51) Int. Cl.
  *B60N 2/00* (2006.01)
  *B60N 2/28* (2006.01)
(52) U.S. Cl.
  CPC ............... *B60N 2002/2815* (2013.01); *B60N 2002/981* (2018.02); *B60R 2022/4816* (2013.01); *B60R 2022/4858* (2013.01)
(58) Field of Classification Search
  USPC .................................................. 340/573.1
  See application file for complete search history.

(56) References Cited

U.S. PATENT DOCUMENTS

| | | | | |
|---|---|---|---|---|
| 2016/0078737 | A1* | 3/2016 | Cohen ................ | G08B 25/08 340/457 |
| 2017/0021800 | A1* | 1/2017 | Seibert ................ | B60N 2/2812 |
| 2018/0025604 | A1* | 1/2018 | Protopsaltis ............ | B60N 2/26 340/457 |
| 2019/0168635 | A1* | 6/2019 | McLaughlin .......... | G08B 21/24 |
| 2021/0024032 | A1* | 1/2021 | Edwards .............. | B60N 2/2812 |

FOREIGN PATENT DOCUMENTS

| | | |
|---|---|---|
| CN | 209634420 U | 11/2019 |
| JP | 2003-63352 A | 3/2003 |
| JP | 2006-159939 A | 6/2006 |
| JP | 2012-153232 A | 8/2012 |
| JP | 2013-14169 A | 1/2013 |
| JP | 2017-81401 A | 5/2017 |
| JP | 2018-510415 A | 4/2018 |
| KR | 10-1851563 B1 | 4/2018 |
| WO | 03/032270 A1 | 4/2003 |
| WO | 2013/064877 A1 | 5/2013 |

* cited by examiner

CHILD SAFETY SEAT ALARM SYSTEM

BACKGROUND OF THE INVENTION

1. Field of the Invention

The present invention relates to a child safety seat, and more specifically, to a child safety seat alarm system.

2. Description of the Prior Art

With the increase of family sedans, more and more families choose to travel together. Although travelling by car is convenient, the issue of child safety and protection in the car is getting more and more important. Since there are more and more child deaths due to traffic accidents, child safety seats are designed for solving the aforementioned problem. The child safety seats can reduce injuries on children. However, people might leave their child in cars due to negligence, which brings safety hazards to the child, in severe cases the child may suffocate and die.

Therefore, it is necessary to provide a child safety seat alarm system to solve the aforementioned problem.

SUMMARY OF THE INVENTION

It is an objective of the present invention to provide a child safety seat alarm system being capable of reminding a user whether or not a child is left in a car, thus preventing a dangerous scenario where the child is left in the car.

In order to achieve the aforementioned objective, the present invention discloses a child safety seat alarm system. The child safety seat alarm system includes a child safety seat, an alarming mechanism, a detection mechanism, a trigger mechanism and a driving portion. The child safety seat is for a child to be seated therein. The alarming mechanism is configured to receive a signal and output an alarm signal. The detection mechanism is configured to detect whether both states of the alarming mechanism and the detection mechanism meet a predetermined criterion. The trigger mechanism is switchable between an open state and a closed state. The detection mechanism is in a non-working state when the trigger mechanism is in the open state. The detection mechanism is in a working state when the trigger mechanism is in the closed state. When the child is seated in the child safety seat, the driving portion is operated to switch the trigger mechanism from the open state to the closed state so as to switch the detection mechanism to the working state. When the detection mechanism detects the states of the alarming mechanism and the detection mechanism meet the predetermined criterion, the alarming mechanism outputs the alarm signal for alarming.

In contrast to the prior art, when the child safety seat alarm system of the present invention confirms that the child is seated in the child safety seat, the driving portion is operated to switch the trigger mechanism from the open state to the closed state so as to switch the detection mechanism to the working state. Furthermore, when the detection mechanism detects that both of the states of the alarming mechanism and the detection mechanism meet the predetermined criterion, the alarming mechanism outputs the alarm signal for alarming and to remind the user that the child is left in a car for preventing a dangerous scenario that the child is left in the car.

Preferably, the predetermined criterion is a predetermined distance, and the detection mechanism is configured to detect a distance between the alarming mechanism and the detection mechanism.

Preferably, when the child safety seat receives a pressure or a buckle assembly of the child safety seat is buckled, the child safety seat alarm system confirms that the child is seated in the child safety seat.

Preferably, when a sensing result is greater than a predetermined pressure value, the child safety seat alarm system further includes a sensing device configured to sense the pressure received by the child safety seat, and the child safety seat alarm system confirms that the child is seated in the child safety seat.

Preferably, the buckle assembly includes a male buckle and a female buckle, and when the male buckle and the female buckle are buckled with each other, the child safety seat alarm system confirms that the child is seated in the child safety seat.

Preferably, the driving portion and the trigger mechanism are disposed on the buckle assembly. When the male buckle and the female buckle are buckled with each other, The driving portion drives the trigger mechanism to switch from the open state to the closed state, and when the male buckle and the female buckle are unbuckled from each other, the driving portion drives the trigger mechanism to switch from the closed state to the open state.

Preferably, the female buckle includes an accommodating slot. The male buckle includes an extending portion for cooperating with the accommodating slot. The driving portion is slidably disposed in the accommodating slot, and the extending portion drives the driving portion to abut against the trigger mechanism for switching the trigger mechanism to the closed state when the male buckle and the female buckle are buckled with each other.

Preferably, a resilient portion is disposed in the accommodating slot for driving the driving portion to move toward the extending portion.

Preferably, a hole is disposed on a wall of the accommodating slot. The trigger mechanism includes a protrusion stretching into the accommodating slot via the hole, and the driving portion slides to abut against the protrusion thereby switching the trigger mechanism to the closed state.

Preferably, the protrusion includes a first slanted surface, and the driving portion includes a second slanted surface for cooperating with the first slanted surface.

Preferably, the driving portion is a conductor for conducting a circuit between the male buckle and the female buckle when the male buckle and the female buckle are buckled with each other.

Preferably, the detection mechanism includes a detector, a mounting plate and a power source portion, and the power source portion and the detector are disposed on the mounting plate.

Preferably, the detection mechanism further includes an USB interface for charging the power source portion.

Preferably, the trigger mechanism is a switch disposed on the mounting plate. The switch in the closed state enables the power source portion to provide electricity for the detector, and the switch in the open state disables the power source portion from providing the electricity for the detector.

Preferably, the alarming mechanism is installed on a mobile terminal of a user.

Preferably, the alarming mechanism includes a key chain for connecting with a car key of a user.

Preferably, the alarming mechanism is a mobile phone for receiving the signal and outputting the alarm signal.

The detailed description and the accompanying drawings are provided as follows to illustrate to the present invention. The accompanying drawings are used to explain the embodiment of the present invention.

REFERENCE SIGNS

Figure 1:
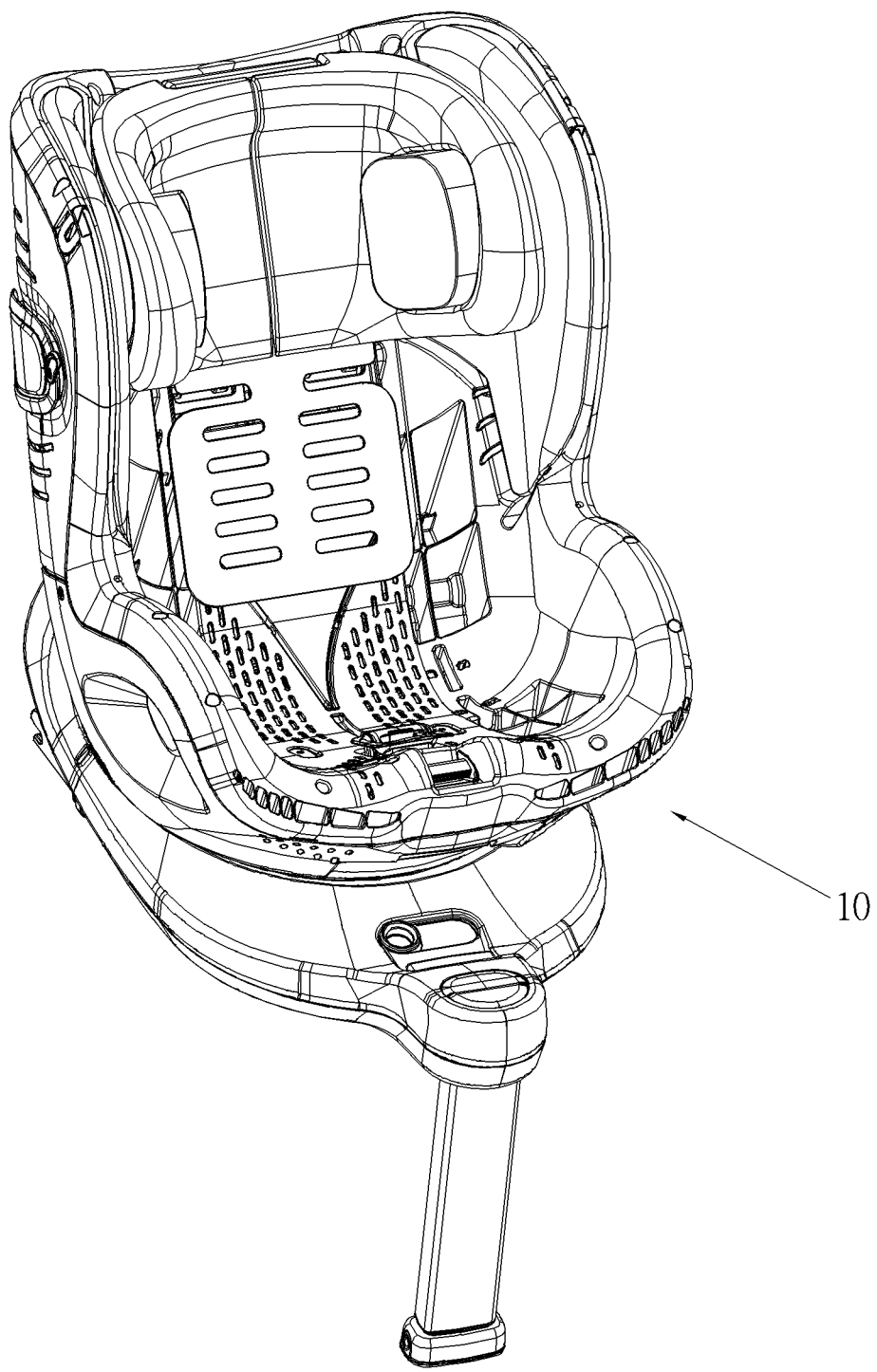
FIG. 1 is a partial structural diagram of a child safety seat alarm system according to an embodiment of the present invention.
Figure 2:
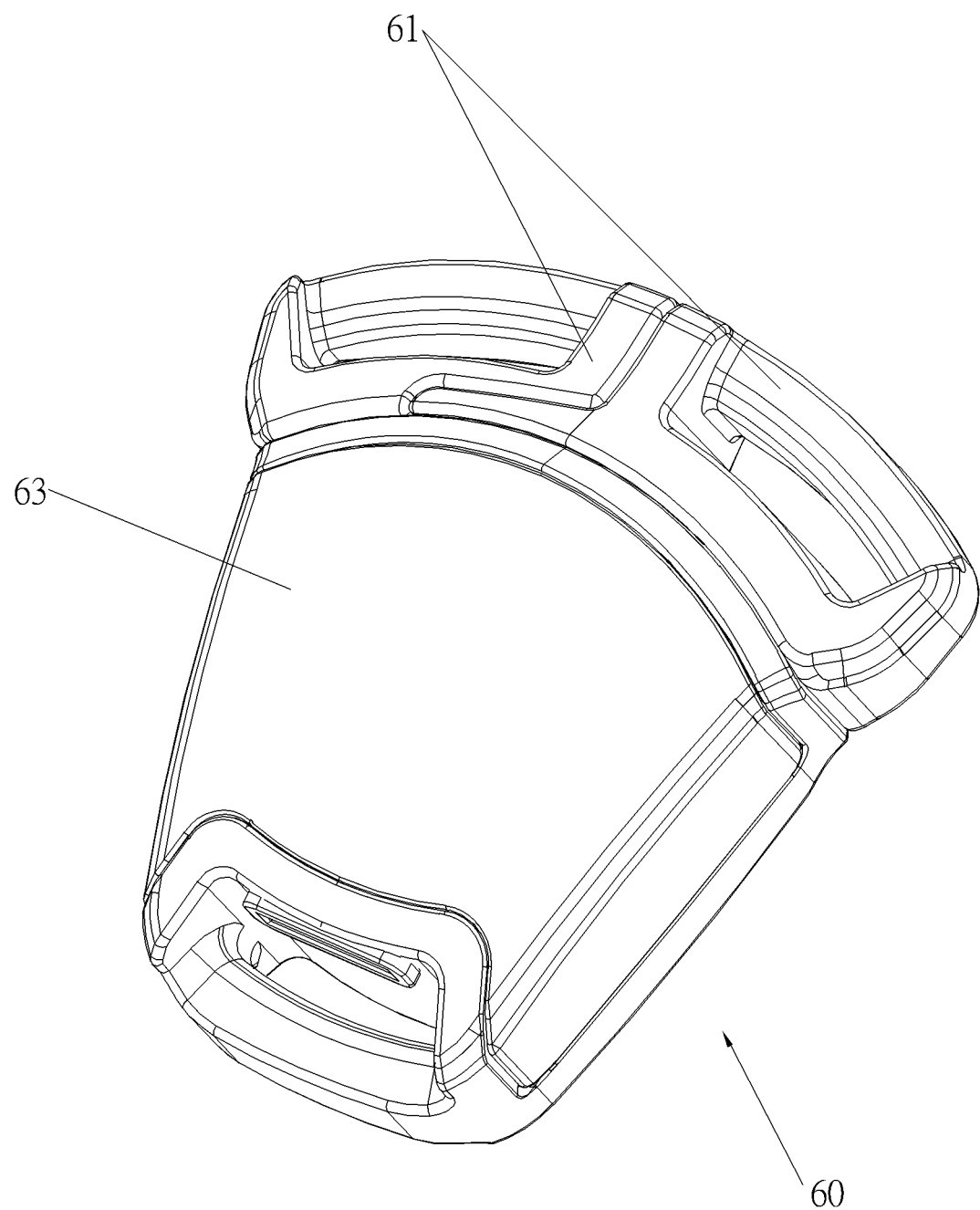
FIG. 2 is a structural diagram of a buckle assembly of the child safety seat alarm system shown in FIG. 1 according to the embodiment of the present invention.

Child safety seat 10, alarming mechanism 20, key chain 21, detection mechanism 30, detector 31, mounting plate 33, power source portion 35, USB interface 37, trigger mechanism 40, protrusion 41, first slanted surface 411, driving portion 50, second slanted surface 51, buckle assembly 60, male buckle 61, extending portion 611, left male buckle 612, right male buckle 613, female buckle 63, accommodating slot 631, hole 632, resilient portion 70.

DETAILED DESCRIPTION

Detailed description of the embodiments of the present invention is illustrated with the accompanying drawings. Similar components are marked with similar reference numerals in the drawings.

Please refer to FIG. 1 to FIG. 7. A child safety seat alarm system of the present invention includes a child safety seat 10, an alarming mechanism 20, a detection mechanism 30, a trigger mechanism 40 and a driving portion 50. The child safety seat 10 is for a child to be seated therein. The alarming mechanism 20 is configured to receive a signal and output an alarm signal. The detection mechanism 30 is configured to detect whether both states of the alarming mechanism 20 and the detection mechanism 30 meet a predetermined criterion. The trigger mechanism 40 is switchable between an open state and a closed state. When the trigger mechanism 40 is in the open state, the detection mechanism 30 is in a non-working state. When the trigger mechanism 40 is in the closed state, the detection mechanism 30 is in a working state. When the child is seated in the child safety seat 10, the driving portion 50 is operated to switch the trigger mechanism 40 from the open state to the closed state, so as to switch the detection mechanism 30 to the working state. When the detection mechanism 30 detects that both of the states of the alarming mechanism 20 and the detection mechanism 30 meet the predetermined criterion, the alarming mechanism 20 outputs the alarm signal for alarming.

The predetermined criterion can be a predetermined distance. The detection mechanism 30 can be configured to detect a distance between the alarming mechanism 20 and the detection mechanism 30. For example, the predetermined distance can be set to 5 meters, and when the detection mechanism 30 detects the distance between the alarming mechanism 20 and the detection mechanism 30 is greater than 5 meters, the alarming mechanism 20 can output the alarm signal for alarming. However, the present invention is not limited thereto. The predetermined distance can be set according to practical demands. Furthermore, the predetermined criterion can be a predetermined time. For example, when the detection mechanism 30 detects a period of that a driver leaves a car is greater than the predetermined time, the alarming mechanism 20 can output the alarm signal for alarming. Therefore, the predetermined criterion is not limited to the aforementioned situations.

When the child safety seat 10 receives a pressure or a buckle assembly 60 of the child safety seat 10 is buckled, the child safety seat alarm system confirms that the child is seated in the child safety seat 10. More specifically, the child safety seat alarm system further includes a sensing device (not shown in the figures) configured to sense the pressure received by the child safety seat 10. When a sensing result of the sensing device is greater than a predetermined pressure value, the child safety seat alarm system confirms that the child is seated in the child safety seat 10. The sensing device can commonly refer to a pressure sensor or a gravity sensor. In this embodiment, please refer to FIG. 2 to FIG. 4. The child safety seat alarm system confirms that the child is seated in the child safety seat 10 when the buckle assembly 60 of the child safety seat 10 is buckled. However, the present invention is not limited to this embodiment. Specifically, the buckle assembly 60 includes a male buckle 61 and a female buckle 63. The child safety seat alarm system confirms that the child is seated in the child safety seat 10 when the male buckle 61 and the female buckle 63 are buckled with each other.

Figure 4:
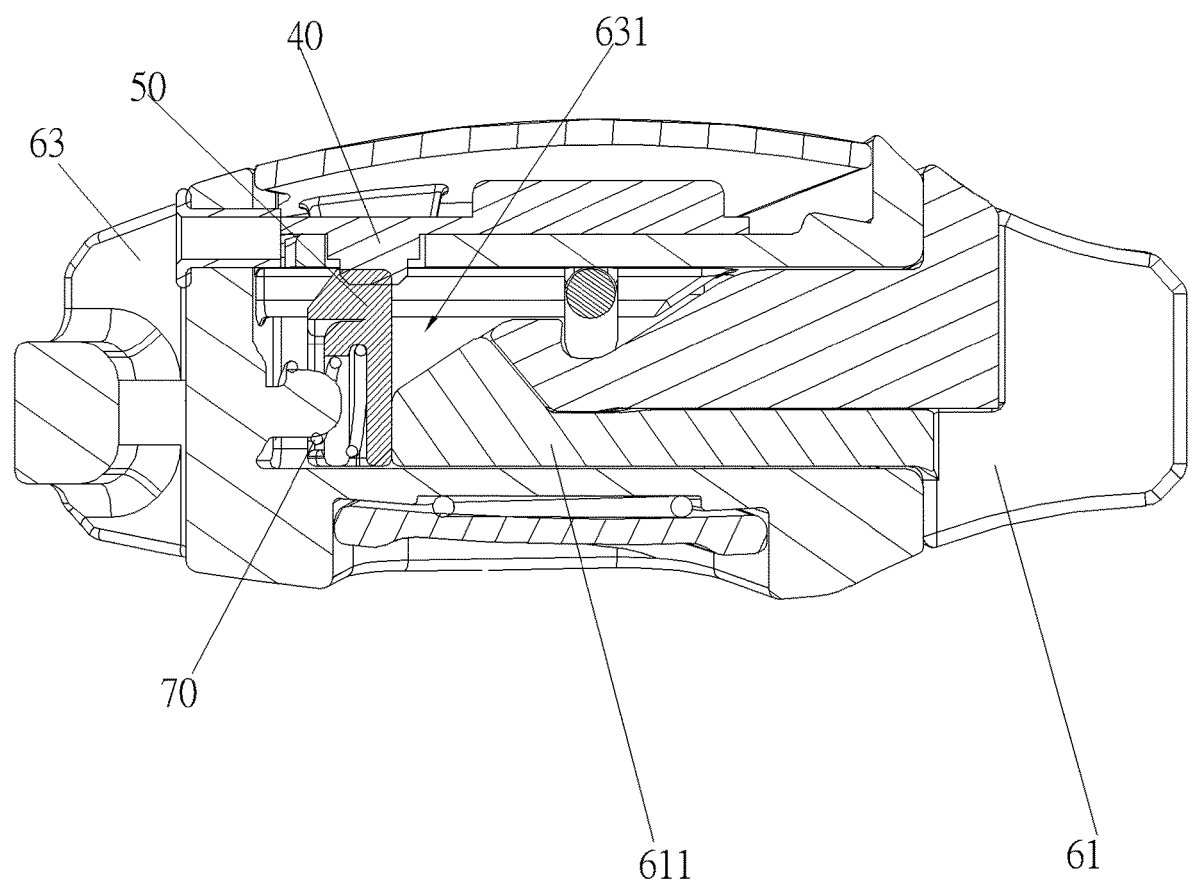
FIG. 4 is a sectional diagram of the buckle assembly shown in FIG. 2 according to the embodiment of the present invention.
Figure 5:
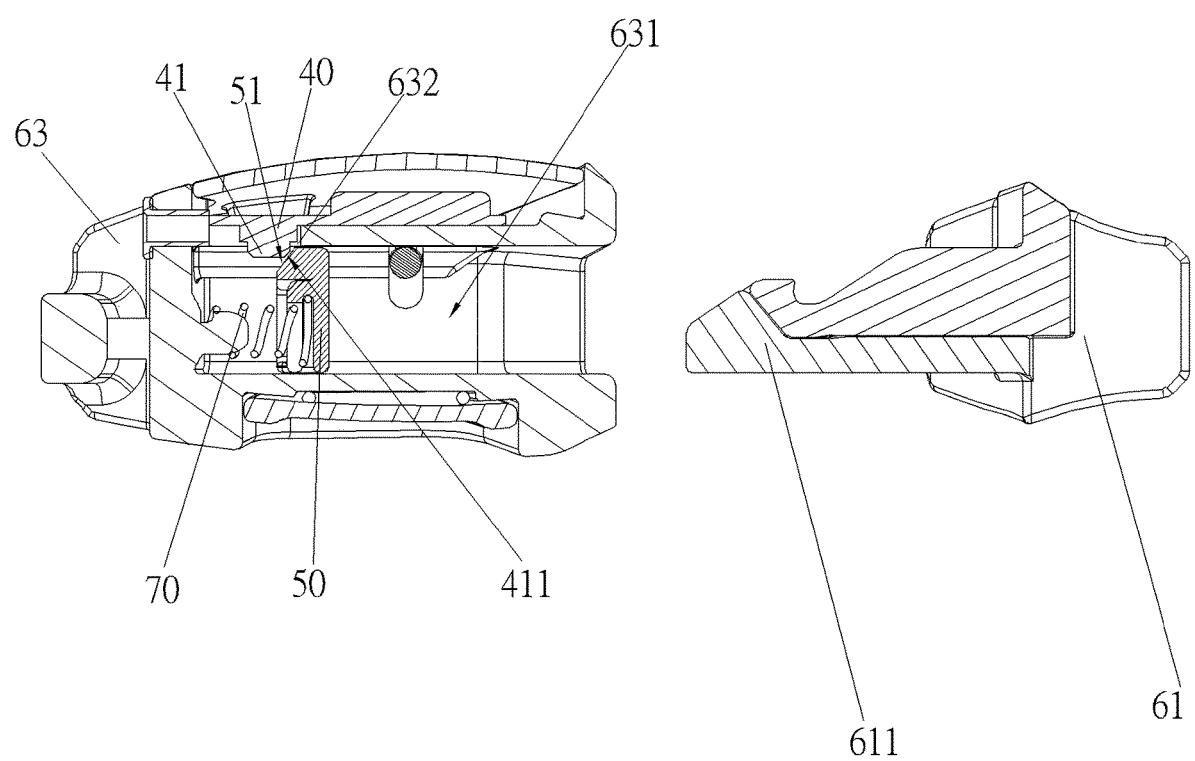
FIG. 5 is a sectional diagram of the buckle assembly as a male buckle is unbuckled from a female buckle according to the embodiment of the present invention.
Figure 6:
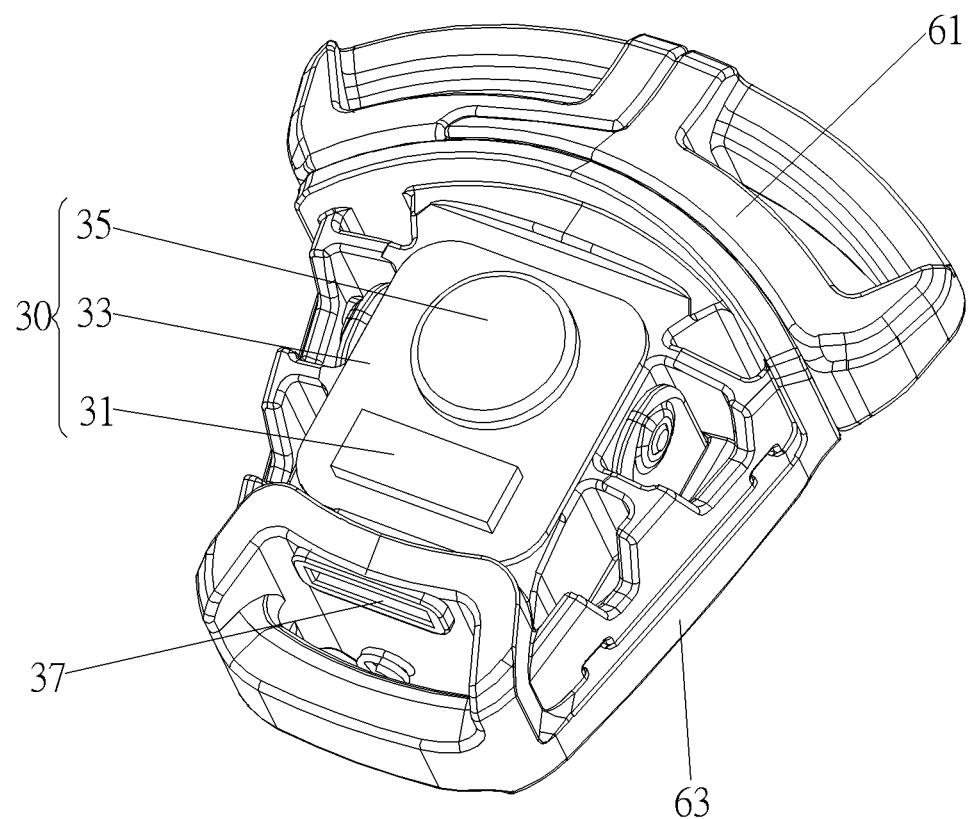
FIG. 6 is a partial structural diagram of the buckle assembly shown in FIG. 2 according to the embodiment of the present invention.

Please refer to FIG. 4 to FIG. 6. The driving portion 50 and the trigger mechanism 40 are disposed on the buckle assembly 60. When the male buckle 61 and the female buckle 63 are buckled with each other, the driving portion 50 drives the trigger mechanism 40 to switch from the open state to the closed state. When the male buckle 61 and the female buckle 63 are unbuckled from each other, the driving portion 50 drives the trigger mechanism 40 to switch from the closed state to the open state. Specifically, the female buckle 63 includes an accommodating slot 631. The male buckle 61 includes an extending portion 611 for cooperating with the accommodating slot 631. The driving portion 50 is slidably disposed in the accommodating slot 631. When the male buckle 61 and the female buckle 63 are buckled with each other, the extending portion 611 drives the driving portion 50 to abut against the trigger mechanism 40 for switching the trigger mechanism 40 to the closed state. In other words, when the male buckle 61 and the female buckle 63 are buckled with each other, the extending portion 611 extends into the accommodating slot 631 to drive the driving portion 50 to abut against the trigger mechanism 40, therefore the trigger mechanism 40 is switched from the open state to the closed state by the movement of the driving portion 50. When the trigger mechanism 40 is in the closed state, the alarming mechanism 20 and the detection mechanism 30 are in the working state. In addition, a resilient portion 70 is disposed in the accommodating slot 631 for driving the driving portion 50 to move toward the extending portion 611. When the male buckle 61 and the female buckle 63 are unbuckled from each other, the resilient portion 70 pushes the driving portion 50 to move toward the extending portion 611, i.e., to move away from the trigger mechanism 40, for switching the trigger mechanism 40 from the closed state to the open state. Furthermore, a hole 632 is disposed on a wall of the accommodating slot 631. The trigger mechanism 40 includes a protrusion 41 stretching into the accommodating slot 631 via the hole 632. The driving portion 50 slides to abut against the protrusion 41 for switching the trigger mechanism 40 to the closed state. For the driving portion 50 to abut against the protrusion 41 smoothly, the protrusion 41 includes a first slanted surface 411, and the driving portion 50 includes a second slanted surface 51 for cooperating with the first slanted surface 411. By a cooperation of the first slanted surface 411 and the second slanted surface 51 for switching the trigger mechanism 40 to the closed state, the driving portion 50 can act on the protrusion 41 when moving.

Figure 3:
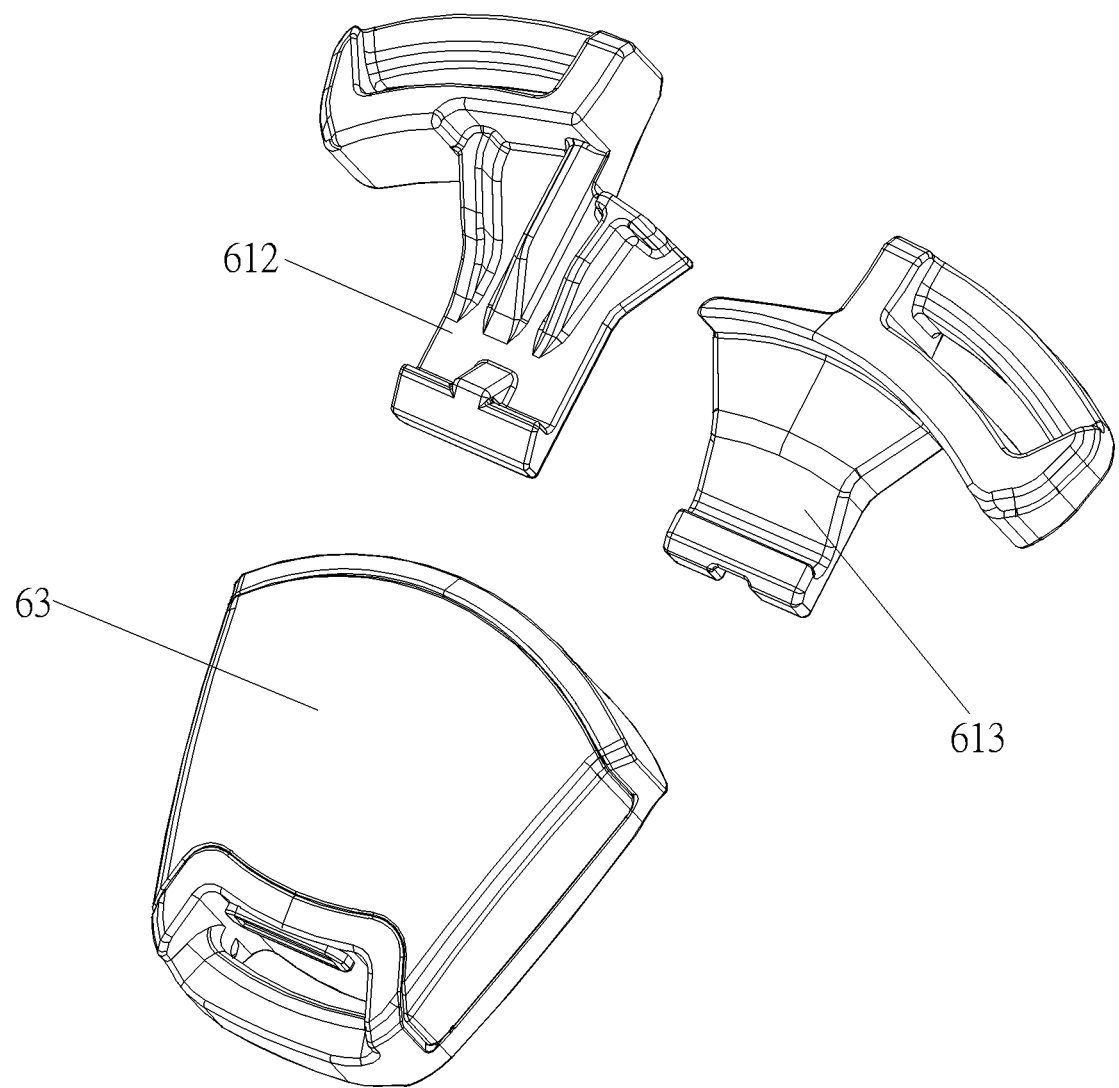
FIG. 3 is an exploded diagram of the buckle assembly shown in FIG. 2 according to the embodiment of the present invention.

In an embodiment, the driving portion 50 can be a conductor. When the male buckle 61 and the female buckle 63 are buckled with each other, a circuit between the male buckle 61 and the female buckle 63 is thus conducted. Specifically, the conductor can be disposed on the male buckle 61 or integrally formed with the male buckle 61. Two wires, being not electrically conducted with each other, are disposed on the female buckle 63. When the male buckle 61 and the female buckle 63 are buckled with each other, the conductor electrically conducts with the two wires on the female buckle 63 to activate a detector 31. As shown in FIG. 3, the male buckle 61 includes a left male buckle 612 and a right male buckle 613, and the conductor can be disposed on the left male buckle 612 and/or the right male buckle 613. Detailed description is omitted herein for simplicity.

Figure 8:
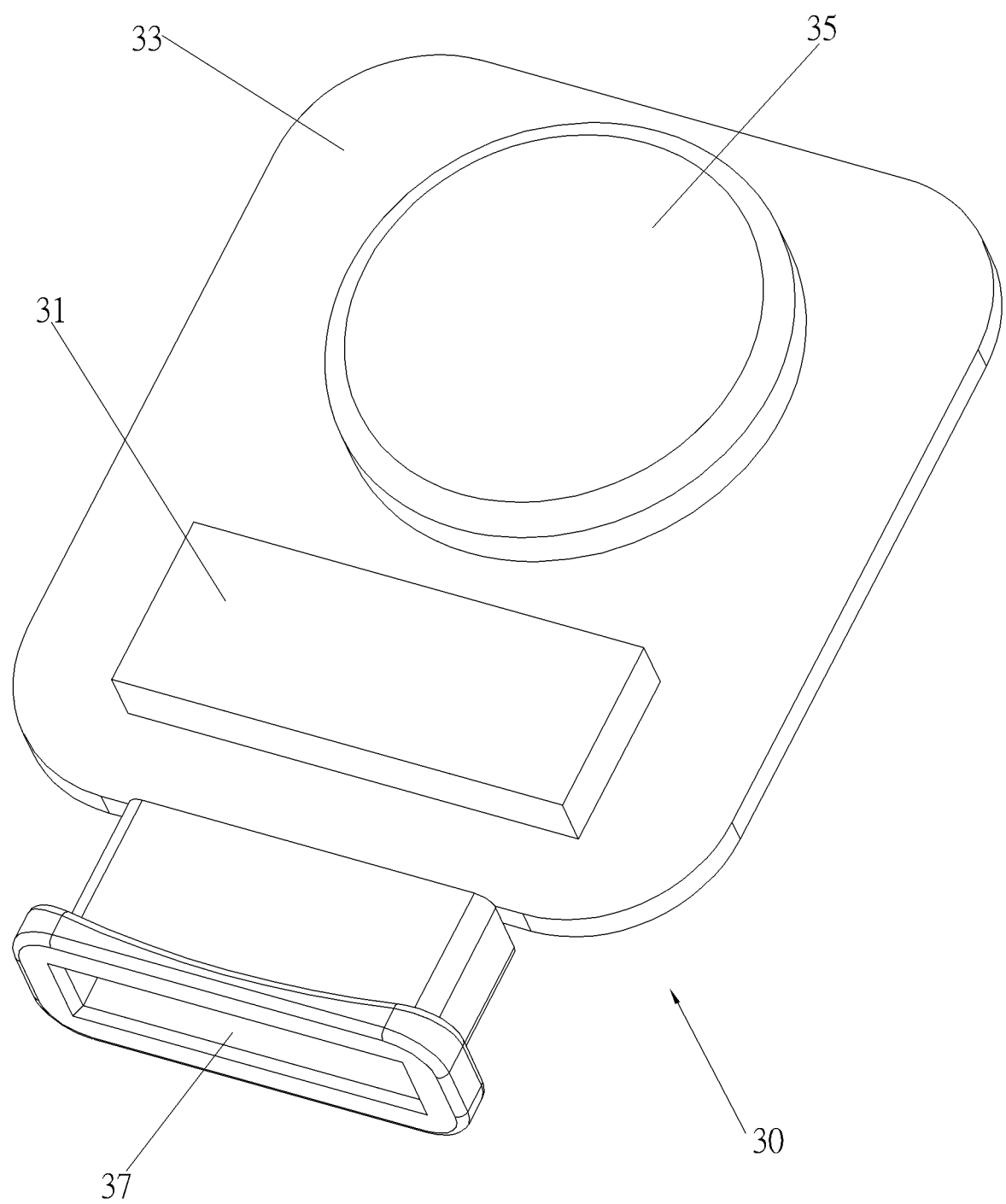
FIG. 8 is a structural diagram of a detection mechanism according to an embodiment of the present invention.
Figure 9:
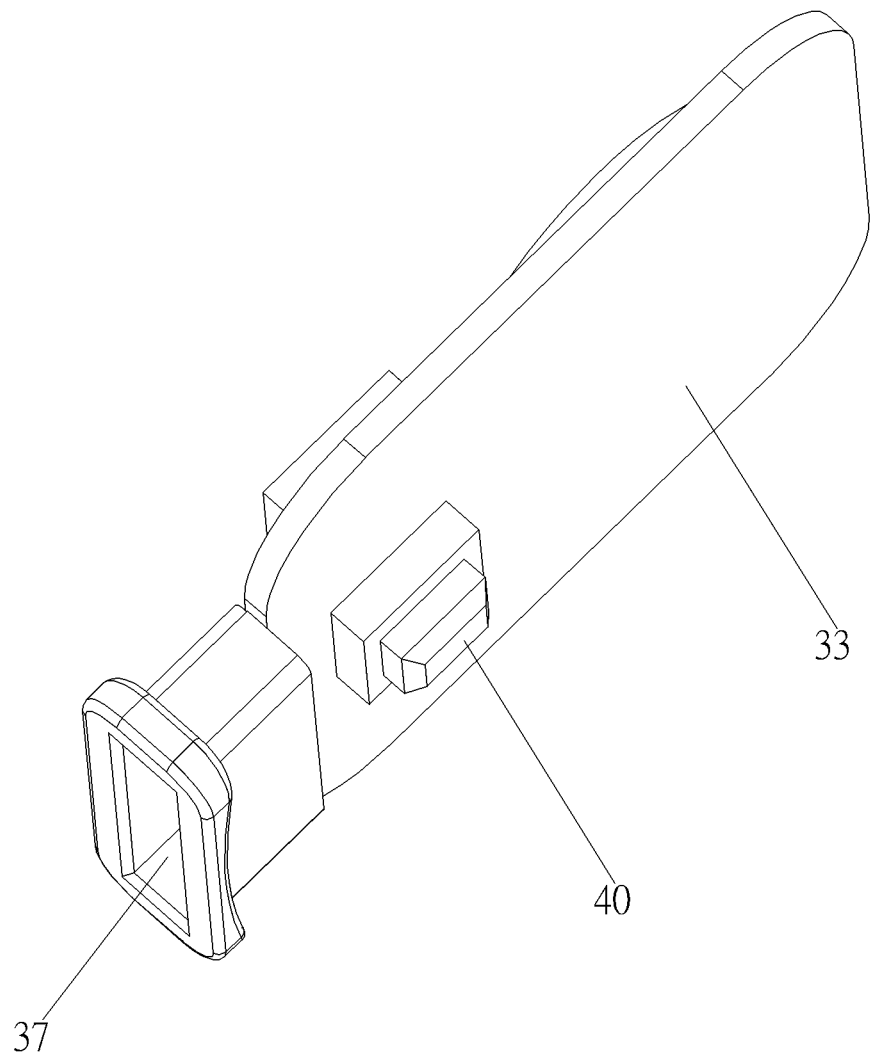
FIG. 9 is a structural diagram of the detection mechanism at another view according to the embodiment of the present invention.

Please refer to FIG. 6 and FIG. 8 to FIG. 9. The detection mechanism 30 includes the detector 31, a mounting plate 33 and a power source portion 35. The power source portion 35 and the detector 31 are disposed on the mounting plate 33. The power source portion 35 is configured to provide electricity for the detection mechanism 30. When the trigger mechanism 40 is in the open state, the power source portion 35 cannot provide the electricity for the detection mechanism 30. When the trigger mechanism 40 is in the closed state, the detection mechanism 30 is electrically communicated with the power source portion 35 and is in the working state. When the detection mechanism 30 is a distance measuring device, the detector 31 can include a signal processing unit and an emitting unit. Detailed description is omitted herein for simplicity. Moreover, the detection mechanism 30 further includes an USB interface 37 for charging the power source portion 35. In this embodiment, the trigger mechanism 40 is a switch disposed on the mounting plate 33. The switch in the closed state enables the power source portion 35 to provide electricity for the detector 31, and the switch in the open state disables the power source portion 35 from providing the electricity for the detector 31. The switch can be switched between the closed state and the open state by an abutting movement and a disengaging movement of the driving portion 50. However, the present invention is not limited thereto.

Figure 7:
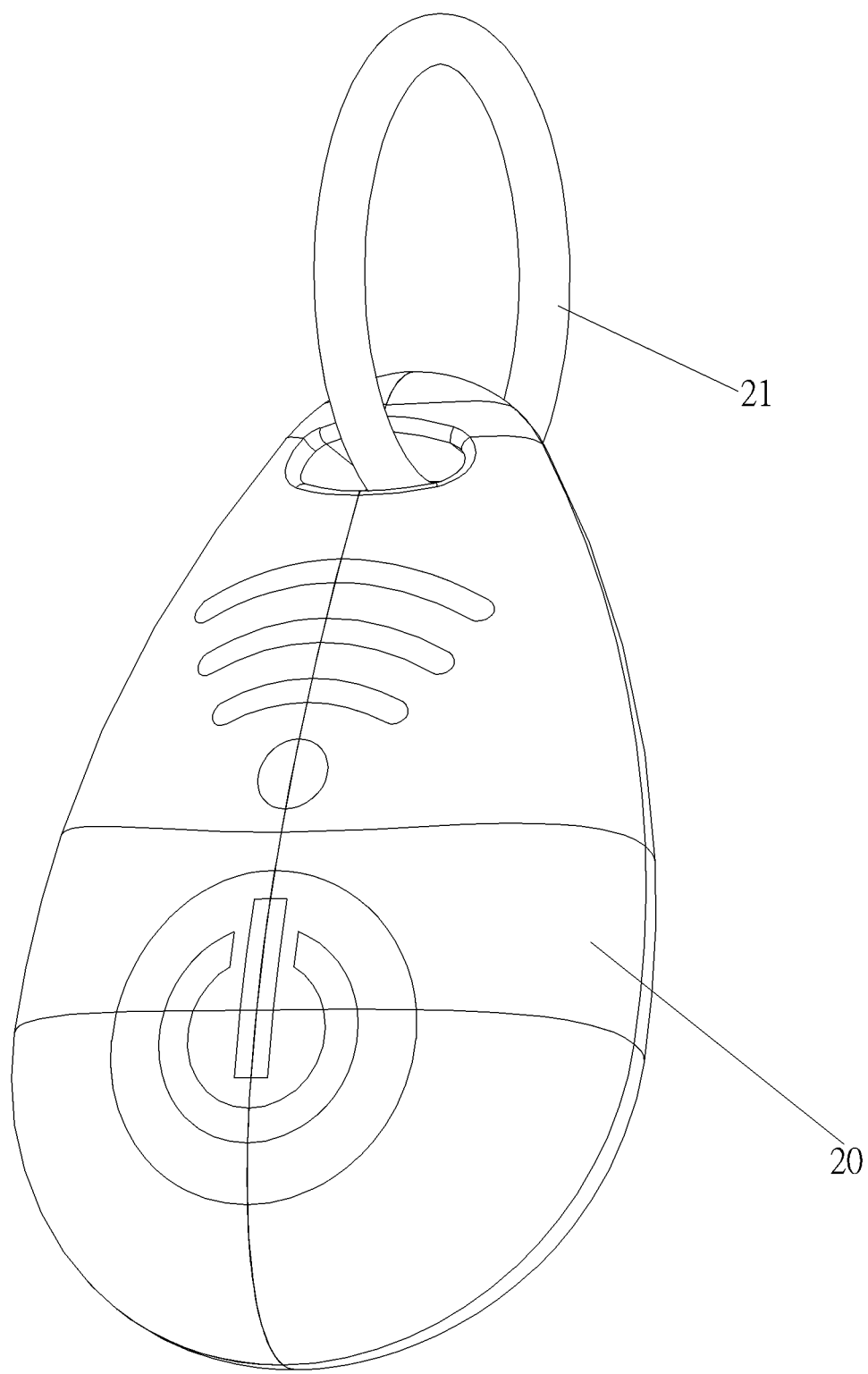
FIG. 7 is a structural diagram of an alarming mechanism according to an embodiment of the present invention.

Please refer to FIG. 7. The alarming mechanism 20 can be an independent component. For example, the alarming mechanism 20 includes a key chain 21, so that the alarming mechanism 20 can be connected with a car key of a user for allowing the user to take the car key with the alarming mechanism 20. Besides, for example, the alarming mechanism 20 can be installed on a mobile terminal of a user. The alarming mechanism 20 further can be a mobile phone for receiving the signal transmitted from the detection mechanism 30 and then outputting the alarm signal by a corresponding application software installed in the mobile phone.

Please refer to FIG. 1 to FIG. 9. The principle of the child safety seat alarm system of the present invention is described as follows.

After the child is seated in the child safety seat 10, the male buckle 61 and the female buckle 63 can be buckled with each other, the extending portion 611 extends into the accommodating slot 631 to move the driving portion 50, the driving portion 50 is moved to abut against the trigger mechanism 40 for switching the trigger mechanism 40 from the open state to the closed state. When the trigger mechanism 40 is in the closed state, the circuit is electrically conducted, and the detection mechanism 30 is electrically communicated with the power source portion 35 for switching the detection mechanism 30 to the working state. When the detection mechanism 30 detects that both of the states of the alarming mechanism 20 and the detection mechanism 30 meet the predetermined criterion, the alarming mechanism 20 outputs the alarm signal for alarming and to remind the user that the child is left in the car.

After the male buckle 61 and the female buckle 63 are unbuckled from each other so that the child can leave from the child safety seat 10, the resilient portion 70 can push the driving portion 50 to move away from the trigger mechanism 40 for switching the trigger mechanism 40 from the closed state to the open state, so that the circuit is not electrically conducted, and the power source portion 35 cannot provide electricity to the detection mechanism 30. The detection mechanism 30 is not electrically communicated with the power source portion 35, so that the detection mechanism 30 is in the non-working state.

In contrast to the prior art, when the child safety seat alarm system of the present invention confirms that the child is seated in the child safety seat 10, the driving portion 50 is operated to switch the trigger mechanism 40 from the open state to the closed state, thereby switching the detection mechanism 30 to the working state. Furthermore, when the detection mechanism 30 detects that both of the states of the alarming mechanism 20 and the detection mechanism 30 meet the predetermined criterion, the alarming mechanism 20 outputs the alarm signal for alarming and to remind the user that the child is left in the car. This would prevent the dangerous scenario that the child is left in the car.

The detailed description is provided to illustrate a preferred embodiment of the present invention. However, the present invention is not limited to the aforementioned embodiment. Any modification or any equivalent combination which is made according to the nature of the present invention should be included in the scope of the invention.

What is claimed is:

1. A child safety seat alarm system comprising:
   a child safety seat for a child to be seated therein;
   an alarming mechanism configured to receive a signal and output an alarm signal;
   a detection mechanism configured to detect whether both states of the alarming mechanism and the detection mechanism meet a predetermined criterion;
   a trigger mechanism switchable between an open state and a closed state, the detection mechanism being in a non-working state when the trigger mechanism is in the open state, the detection mechanism being in a working state when the trigger mechanism is in the closed state; and
   a driving portion, when the child is seated in the child safety seat, the driving portion being operated to switch the trigger mechanism from the open state to the closed state so as to switch the detection mechanism to the working state, when the detection mechanism detects the states of the alarming mechanism and the detection mechanism meet the predetermined criterion, the alarming mechanism outputting the alarm signal for alarming.

2. The child safety seat alarm system of claim 1, wherein the predetermined criterion is a predetermined distance, and the detection mechanism is configured to detect a distance between the alarming mechanism and the detection mechanism.

3. The child safety seat alarm system of claim 1, wherein when the child safety seat receives a pressure or a buckle assembly of the child safety seat is buckled, the child safety seat alarm system confirms that the child is seated in the child safety seat.

4. The child safety seat alarm system of claim 3, wherein the child safety seat alarm system further comprises a sensing device configured to sense the pressure received by the child safety seat, and when a sensing result of the sensing device is greater than a predetermined pressure value, the child safety seat alarm system confirms that the child is seated in the child safety seat.

5. The child safety seat alarm system of claim 3, wherein the buckle assembly comprises a male buckle and a female buckle, and when the male buckle and the female buckle are buckled with each other, the child safety seat alarm system confirms that the child is seated in the child safety seat.

6. The child safety seat alarm system of claim 5, wherein the driving portion and the trigger mechanism are disposed on the buckle assembly, when the male buckle and the female buckle are buckled with each other, the driving portion drives the trigger mechanism to switch from the open state to the closed state, and when the male buckle and the female buckle are unbuckled from each other, the driving portion drives the trigger mechanism to switch from the closed state to the open state.

7. The child safety seat alarm system of claim 6, wherein the female buckle comprises an accommodating slot, the male buckle comprises an extending portion for cooperating with the accommodating slot, the driving portion is slidably disposed in the accommodating slot, and the extending portion drives the driving portion to abut against the trigger mechanism for switching the trigger mechanism to the closed state when the male buckle and the female buckle are buckled with each other.

8. The child safety seat alarm system of claim 7, wherein a resilient portion is disposed in the accommodating slot for driving the driving portion to move toward the extending portion.

9. The child safety seat alarm system of claim 7, wherein a hole is disposed on a wall of the accommodating slot, the trigger mechanism comprises a protrusion stretching into the accommodating slot via the hole, and the driving portion slides to abut against the protrusion thereby switching the trigger mechanism to the closed state.

10. The child safety seat alarm system of claim 9, wherein the protrusion comprises a first slanted surface, and the driving portion comprises a second slanted surface for cooperating with the first slanted surface.

11. The child safety seat alarm system of claim 5, wherein the driving portion is a conductor for conducting a circuit on the male buckle with a circuit on the female buckle when the male buckle and the female buckle are buckled with each other.

12. The child safety seat alarm system of claim 1, wherein the detection mechanism comprises a detector, a mounting plate and a power source portion, and the power source portion and the detector are disposed on the mounting plate.

13. The child safety seat alarm system of claim 12, wherein the detection mechanism further comprises an USB interface for charging the power source portion.

14. The child safety seat alarm system of claim 12, wherein the trigger mechanism is a switch disposed on the mounting plate, the switch in the closed state enables the power source portion to provide electricity for the detector, and the switch in the open state disables the power source portion from providing the electricity for the detector.

15. The child safety seat alarm system of claim 1, wherein the alarming mechanism is installed on a mobile terminal of a user.

16. The child safety seat alarm system of claim 1, wherein the alarming mechanism comprises a key chain for connecting with a car key of a user.

17. The child safety seat alarm system of claim 1, wherein the alarming mechanism is a mobile phone for receiving the signal and outputting the alarm signal.

\* \* \* \* \*